United States Patent [19]
Cai et al.

[11] Patent Number: 5,121,408
[45] Date of Patent: Jun. 9, 1992

[54] SYNCHRONIZATION FOR ENTRY TO A NETWORK IN A FREQUENCY HOPPING COMMUNICATION SYSTEM

[75] Inventors: Khiem V. Cai, Brea; Roger J. O'Connor, Garden Grove, both of Calif.

[73] Assignee: Hughes Aircraft Company, Los Angeles, Calif.

[21] Appl. No.: 422,257

[22] Filed: Oct. 16, 1989

[51] Int. Cl.⁵ ............................................. H04L 27/30
[52] U.S. Cl. ......................................... 375/1; 370/50; 375/40; 375/100; 375/115; 455/51.1; 455/71; 455/161.1; 455/165.1; 455/166.1
[58] Field of Search ........................ 380/34, 38, 39, 46, 380/48; 375/1, 40, 100, 115; 370/50; 455/51, 56, 71, 76, 161, 165, 166

[56] References Cited
U.S. PATENT DOCUMENTS

| | | | |
|---|---|---|---|
| 4,677,617 | 6/1987 | O'Connor et al. | 370/50 |
| 4,761,796 | 8/1988 | Dunn et al. | 375/1 |
| 4,780,885 | 10/1988 | Paul et al. | 375/40 |

OTHER PUBLICATIONS

Evangelos Kranakis, *Primality and Cryptography;* (John Wiley & Sons, New York, 1986; Section 4.1, pp. 98–99).

*Primary Examiner*—Bernarr E. Gregory
*Attorney, Agent, or Firm*—Wanda K. Denson-Low

[57] ABSTRACT

Synchronization of a frequency hopping transceiver to a network by embedding synchronization codes in the pseudo-random frequency hopping transmission sequence. A receiver is implemented with a frequency detector and a correlator to generate a correlator signal in response to the synchronization codes in the pseudo-random frequency hopping transmission sequence. Detection of a peak in the correlator signal is indicative of synchronization of the receiver with the network. The network entry synchronization scheme is such that, when two transceivers A and B are communicating, a third unnetworked transceiver C extracts the hidden network entry code pattern from the A-B transmission in order to enter the network. As a part of the communication between the two transceivers A and B, transceiver A transmits a known pattern as a hidden part of the communication which allows transceiver C to enter the A-B network. This hidden code pattern permits rapid synchronization and correction of large initial time errors, and permits correction of time drift from then on.

14 Claims, 2 Drawing Sheets

SYNCHRONIZATION FOR ENTRY TO A NETWORK IN A FREQUENCY HOPPING COMMUNICATION SYSTEM

BACKGROUND

The field of the invention relates to communication systems, and in particular, to synchronization for entry to a frequency hopping communication network.

Modern high frequency communication systems commonly utilize frequency hopping spread spectrum waveforms to achieve a high degree of resistance to jamming. To avoid frequency following jammers, the frequency hopping waveform must hop quickly among many frequencies in a pseudo-random fashion. The pseudo-random frequency pattern is conventionally locked to the system timing since frequency hopping is essentially a time-frequency coded technique.

In order to improve resistance to frequency following jammers, the hop rate is made fast enough to prevent a jammer from tracking each hop. This requires transceivers within the network to have very accurate timing with very little time drift between transceiver units. In order for the communication network links to perform properly, all units in the network must have the same timing. The network transceiver must initially synchronize with the rapid frequency hopping code of the network in order to communicate with the network. The transceiver must also maintain accurate timing with low time drift in order to maintain synchronization with the network.

In conventional systems, low power consumption and low cost are often system requirements. These requirements may result in the use of a system time standard that has an initial inaccuracy of tens of seconds and a drift of one or two parts per million. Hence, a synchronization arrangement is needed to initially synchronize a transceiver in the presence of relatively large time errors, and to continually track the synchronization and correct the time to prevent the networked units from drifting apart. Some conventional synchronization techniques use long preambles which allow a receiver to correct its time. Other conventional synchronization techniques use shorter preambles, but still longer than the uncertainty time. However, these techniques use parallel processing of multiple channels.

Accordingly, it is a feature of the present invention to provide a network synchronization arrangement for frequency hopping communication systems that corrects for large initial time errors, and that continuously or periodically updates system timing. Another feature of the invention is the provision of a network synchronization arrangement that does not use long preambles or special broadcasts.

SUMMARY OF THE INVENTION

In accordance with these and other features of the invention, a network entry synchronization system is provided wherein, when two transceivers A and B are communicating, a third unnetworked transceiver C extracts the network entry code pattern from the A-B transmission in order to enter the network. The invention employs hidden network entry synchronization codes. As a part of the communication between the two transceivers A and B, transceiver A transmits a known pattern as a hidden part of the communication which allows transceiver C to enter the A-B network. This hidden code pattern permits rapid synchronization and correction of large initial time errors, and permits correction of time drift from then on. The communication system thus provides for network entry synchronization without a conventional synchronizing preamble. Synchronization is facilitated by embedding synchronization codes in the frequency hopping sequence and, as a result, eliminating the conventional preamble.

The frequency hopping communication system of the present invention comprises a transmitter section and a receiver section. The transmitter section includes a controller that is adapted to generate a sequence of control signals for each of a plurality of frames of communication information. The sequence of control signals includes at least one synchronization control signal (and typically two) intermixed with a plurality of data control signals. A frequency synthesizer is employed to convert the control signals into a sequence of pseudo-random frequency signals including a synchronization frequency signal and a plurality of data frequency signals. The transmitter section is coupled to the frequency synthesizer that is employed to transmit the synchronization frequency signal and the plurality of data frequency signals.

The receiver section in accordance with the invention is implemented with a frequency detector which is adapted to generate a sequence of frequency signals in response to receipt of the synchronization frequency signal and the plurality of data frequency signals. A correlator is coupled to the frequency detector and is adapted to detect and correlate the synchronization frequency signal to generate a correlator signal. Detection of a peak in the correlator signal is indicative of synchronization of the receiver section with the network. The correlator is adapted to control a synchronizing clock that maintains the correct timing to keep the receiver networked.

The present invention initially synchronizes the transceiver for access to the network in the presence of relatively large time errors and maintains synchronization with the network in the presence of relatively high time drift rates. It is particularly appropriate for transceivers that are tolerant to jamming and for high performance modems. The present invention provides rapid initial network synchronization and continuous network resynchronization even in the presence of large initial time errors, large time drifts, jamming, multipath fading, and other communication conditions. It does not use a preamble, and does not require a special preamble broadcast. The present invention uses a small percentage of the frequency hopping waveform energy to provide continuous user time network entry so that any user can perform network synchronization whenever necessary. Thus, the synchronization process is continuous and reception is most likely, since the receiver can achieve synchronization at any time and repeat the process as many times as is necessary.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

In accordance with the principles of the present invention, there is provided a system of network entry synchronization which allows unnetworked transceivers having large initial time error to enter a network by aligning their timing with network time. Such a process is essential to establishing a frequency hopping communications network. The principles of the present invention may be applied to all frequency hopping networks, but they are particularly useful for protecting against communication network jamming, and multipath fading such as is found in the HF communication band.

The present invention provides a system of network entry synchronization which uses a very short code pattern but still allows the receiver to correct for large initial time errors. The present invention also provides for continuous monitoring and correction of timing errors to prevent the timing of the transceivers from drifting apart. The key features of this invention are that time hopping of the code pattern not only transmits energy pulses to allow energy detection at the receiver, but also provides differential encoding of the time segment information to identify the transmitter timing segment.

As will be more fully understood hereinafter, when two units A and B are communicating, and a third unit C is attempting to enter the A-B network, unit C extracts the network entry code pattern from the A-B transmission in order to gain access to the network. That is, as a part of the communication between the two units A and B, unit A transmits a known pattern which allows unit C to enter the A-B network.

Figure 1:
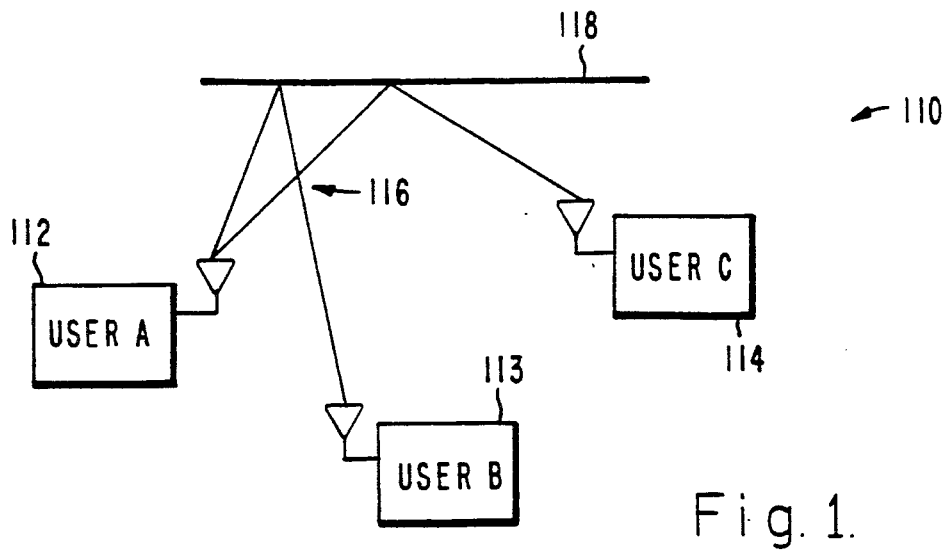
FIG. 1 is a block diagram representation of a communication network in which the present invention may be employed.

Referring now to FIG. 1 of the drawings, there is shown a schematic diagram of a communications network 110 comprising three radio transceivers: user A 112, user B 113, and user C 114. As illustrated in FIG. 1, user A 112 is communicating with user B 113 over a communications link 116 which is represented as bouncing off of a layer 118 which may be the ionosphere. User C 114, which desires to enter the network of user A 112 and user B 113, is monitoring the transmissions between user A 112 and user B 113 for the purpose of extracting the network entry code pattern from the A-B transmission.

In accordance with the present invention, user A 112 generates a frequency hopping transmission having data signals interleaved or intermixed or embedded with synchronization signals. This may be considered to be preamble-less synchronization. User C 114 processes the synchronization signals to initially achieve synchronization and to maintain synchronization. The received synchronization codes are also utilized to continuously resynchronize user B 113 and the received data codes are for communication. New user C 114 that is not yet synchronized, and hence is not yet in the network, receives synchronization codes and data codes transmitted by user A 112. The synchronization codes are utilized to initially synchronize user C, but the received data codes are not utilized because user C 114 is not yet synchronized. However, after synchronization has been achieved, the received data codes are utilized by user C 114.

Figure 2:
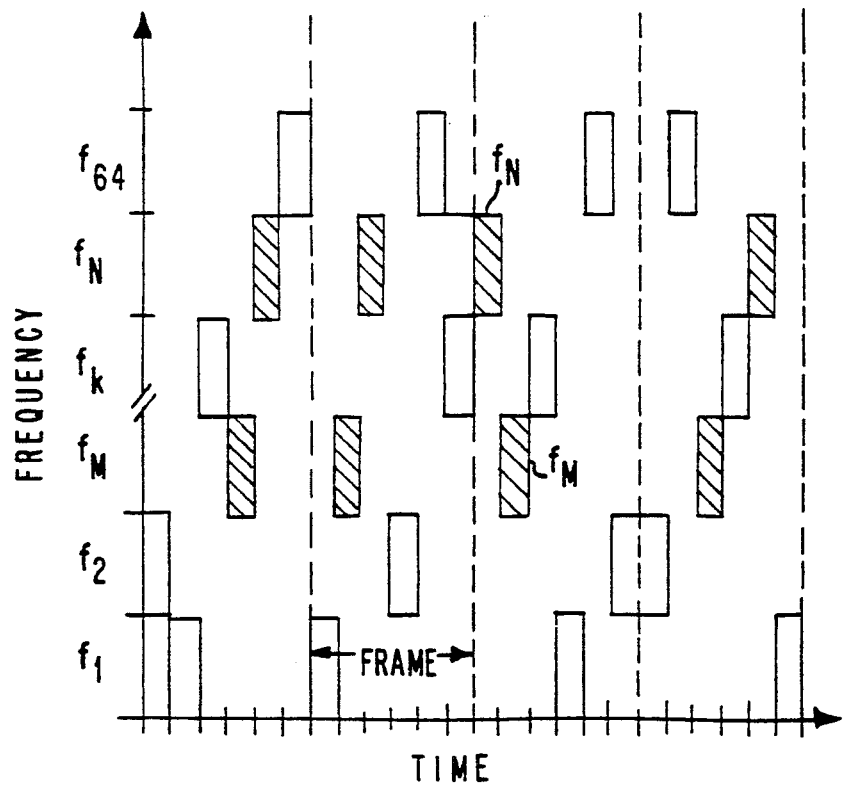
FIG. 2 is a plot of frequency versus time having embedded synchronization codes in accordance with the present invention.

Referring now to FIG. 2, there is shown an example of interleaved data and synchronization codes. In this example, there are 64 different frequencies $f_1$ to $f_{64}$. Certain frequencies, in this example two frequencies $f_M$, $f_N$ (shown in black in FIG. 2), are selected as synchronization frequencies and the remaining 62 frequencies are available for data encoding. For simplicity, only a few of the 64 frequencies for data are shown in FIG. 2. A pseudo-random code sequence is shown for each frame in this example, which sequences from $f_2$, to $f_1$, to $f_k$, to $f_M$, to $f_N$, and to $f_{64}$. A synchronizating correlator (not shown) is tuned to a synchronizing code ($f_M$, $f_N$) signature. A data correlator (not shown) is tuned to the data code ($f_2$, $f_1$, $f_k$, and $f_{64}$) signature. The synchronization frequency code and the data frequency code are interleaved and transmitted continuously. The synchronizing code is a very short code, less than the length of the uncertainty time compared with conventional preambles. Also, the synchronization code is interleaved within the data transmission in contrast to conventional long preambles preceding the data transmission.

Figure 3:
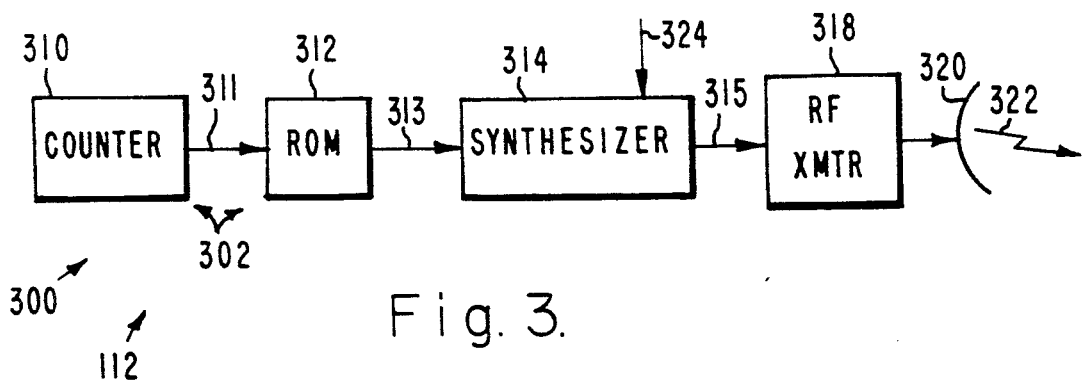
FIG. 3 is a block diagram of a frequency hopping transmitter in accordance with the present invention.

Referring now to FIG. 3, there is shown a frequency hopping transmitter 300 of the user A 112 constructed in accordance with the present invention. The transmitter 300 comprises a digital controller 302, a synthesizer 314 coupled to the ROM 312, an RF transmitter 318 coupled to the output of the synthesizer 318, and an antenna 320 coupled to the output of the RF transmitter 318. The digital controller 302 includes a counter 310 and a read only memory (ROM) 312. The digital controller 302 is adapted to generate a pseudo-random code which is converted to a sequence of frequencies for transmission by the synthesizer 314.

The counter 310 is adapted to generate sequential addresses 311 to the ROM 312. The ROM 312 stores a sequence of frequency codes having a pseudo-random signature and provides an output a pseudo-random signature signal 313. The signature signal 313 is coupled to the frequency synthesizer 314 which generates frequency signals 315 in response to the frequency codes in the signature signal 313. The frequency signals 315 are transmitted by the RF transmitter 318 and antenna 320 as a transmitter signal 322. Each frequency signal 315 may be modulated with data, such as with differential phase shift keyed (DPSK) modulation, for example. The frequency signals 315 are also modulated by the synthesizer 314 in response to communication or data signals 324 applied thereto.

The transmitter 300 described above is implemented with a ROM-based digital controller 302 having a pseudo-random sequence of frequency codes stored therein including interleaved data codes and synchronization codes, such as the frequency sequence shown in FIG. 2. Sequential accessing of the stored codes from the ROM 312 and generation of frequencies by the frequency synthesizer 314 in response thereto generates the frequency hopping pseudo-random signature for transmission as transmitter signal 322.

Figure 4:
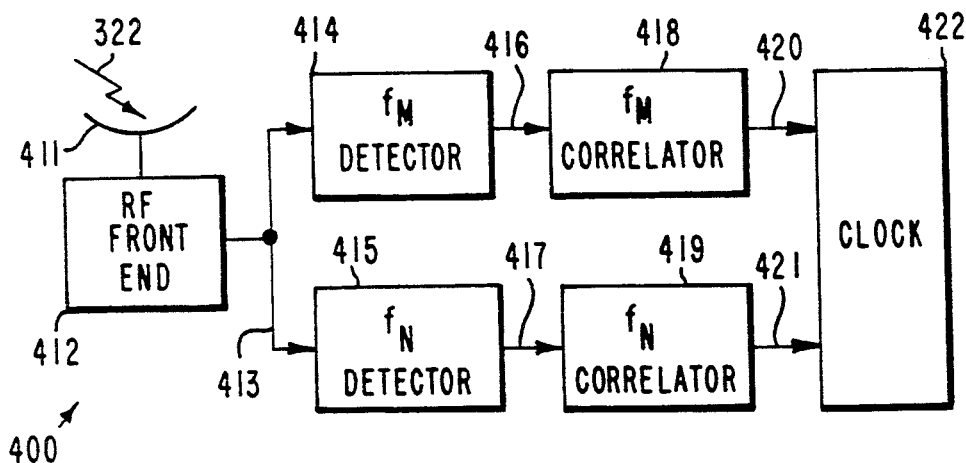
FIG. 4 is a block diagram of a frequency hopping receiver in accordance with the present invention.

Referring now to FIG. 4 of the drawings, there is shown a frequency hopping receiver 400 of the user C 114, for example, constructed in accordance with the present invention. This is a multiple channel receiver 400 having a separate channel for each synchronization frequency, of which two channels $f_m$, $f_n$ of the 64 channels are shown. The receiver 400 comprises an RF front end 412, or preprocessor, which is coupled to two channels 405, 406 that are adapted to preprocess the $f_M$ and $f_N$ frequency signals. Each channel 405, 406 comprises a detector 414, 415 whose respective outputs are coupled to a correlator 418, 419, whose respective outputs are coupled to a synchronizing clock 422.

The antenna 411 and RF front end 412 are adapted to receive and preprocess the transmitter signal 322 and generate a received signal 413 that is coupled to the multiple synchronization channels $f_M$, $f_N$. The $f_M$ frequency detector 414 and the $f_N$ frequency detector 415 respectively detect the $f_M$ and $f_N$ frequencies and generate $f_M$ and $f_N$ frequency detector signals 416, 417. The respective outputs of the frequency detectors 414, 415 comprise amplitude signals, indicative of the occurrence of a particular frequency component ($f_M$, $f_N$), and modulation signals comprising the modulation on the detected frequency component.

For example, the amplitude signal may be a single bit digital signal or a multiple bit digital signal that is indicative of detection of the frequency component or magnitude of the frequency component. Also, the modulation signal may be a single bit digital signal or a multiple bit digital signal that is indicative of detection or magnitude of the frequency component. In the receiver 400 of FIG. 4, the amplitude signal is a single bit digital signal that is in a one-state when the frequency component is detected and is in a zero-state when the frequency component is not detected. The modulation signal is a two phase DPSK single bit digital signal that is in a one-state when the DPSK modulation has a first phase condition and is in a zero-state when the DPSK modulation has a second phase condition.

The $f_M$ correlator 418 for the $f_M$ frequency channel correlates the occurrences of the $f_M$ frequency detector signal 416 to determine when the occurrences are consistent with the signature for the $f_M$ frequency component. The $f_M$ correlator 418 generate an $f_M$ correlator output signal 420 in response to these detected occurrences. Similarly, the $f_N$ frequency detector 415 detects the $f_N$ frequency and generates an $f_N$ frequency detector signal 417 in response thereto. The $f_N$ correlator 419 correlates the occurrences of the $f_N$ frequency detector signal 417 to determine when the occurrences are consistent with the signature for the $f_N$ frequency component and generates an $f_N$ correlator output signal 421 in response thereto. The correlator output signals 420, 421 synchronize the receiver 400, such as by resetting the synchronization clock 422.

Correlator taps are typically placed having a spacing that is consistent with occurrence of the selected frequency components. For example, in a tapped delay line type of correlator 418, the spacing of the $f_M$ frequency component in the transmitted signal should be consistent with the spacing of the taps from the shift register 510 for the $f_M$ channel. Similarly, the spacing of the $f_N$ frequency component in the transmitted signal should be consistent with the spacing of the taps from the shift register for the $f_N$ channel.

Figure 5:
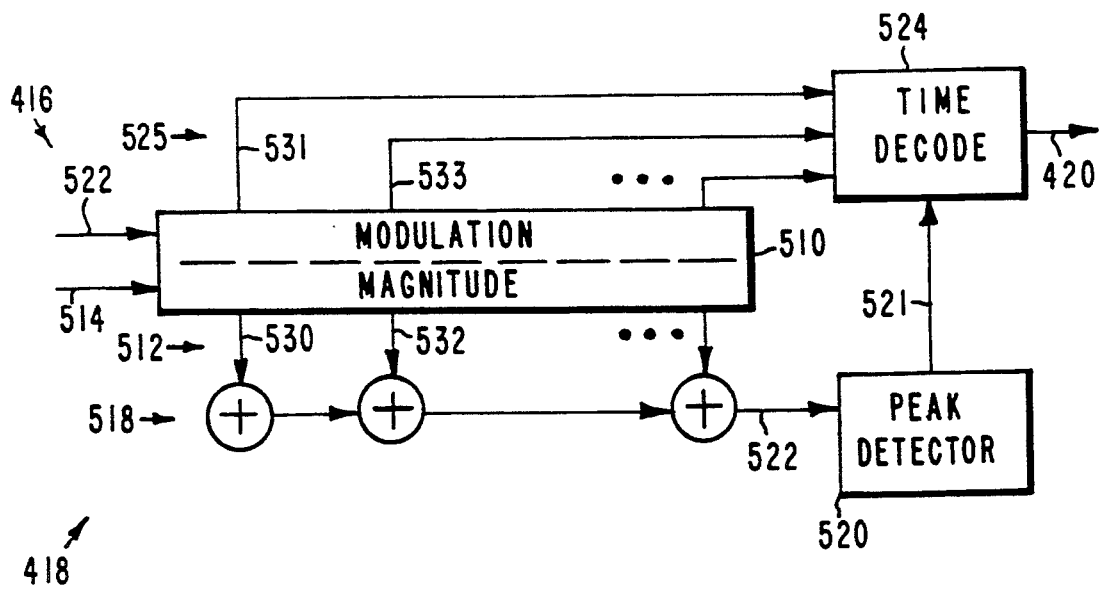
FIG. 5 is a block diagram of a correlator for use in the receiver of FIG. 4.

Referring now to FIG. 5 of the drawings, there is shown a block diagram of the synchronization arrangement of the receiver 400 of the present invention, and in particular, one correlators 418 shown in FIG. 4. The correlator 418 comprises a shift register 510 which has two sections, namely a magnitude section and a modulation section. The shift register 510 has a plurality of taps 512, 525 for each section. The taps 525 of the modulation section are respectively coupled to a time decode circuit 524. The taps 512 of the magnitude section are coupled by way of respective summers 518 to a peak detector 520. The peak detector 520 is coupled to the time decode circuit 524 and is adapted to provide enabling signals thereto.

The correlator 418 operates as a time domain correlator, for example, and is implemented by the shift register 510 having the plurality of spaced apart taps 512, 525. The $f_M$ frequency signal 416 comprising frequency magnitude detector signal 514 and modulation detector signal 522 are shifted through the shift register 510 and are provided at each of the taps 512, 525. For example, a first magnitude signal is provided at a first magnitude signal tap 530 and a corresponding first modulation signal, is provided at a first modulation signal tap 531. Similarly, a second magnitude signal is provided at a second magnitude signal tap 532 and a corresponding second modulation signal, is provided at a second modulation signal tap 533, and so forth for all taps in the shift register 510.

The plurality of summers 518 are connected to the magnitude signal taps 512 to sample and sum energy that is delayed by the shift register 510. If the received signal timing and the tap spacing are aligned, the summed energy and the output signal 522 from the correlator taps 512 is large and hence a high correlation output signal 522 is generated. If the timing and the taps are not aligned the energy at the correlator taps 512 is small due to the randomness of the hidden pattern and hence a low correlation output signal 522 is generated. The peak detector circuit 520 (or threshold detector circuit) detects a peak of the sum signal 522 that is indicative of a correlation peak and occurrence of synchronization and generates an output signal 521 to enable a time decode circuit 524 to resynchronize the clock 422 shown in FIG. 4. When enabled by the correlation signal 521, the time decode circuit 524 processes the modulation signals from the modulation taps 525 to generate resynchronization signals 420 to resynchronize the clock 422 of FIG. 4.

Increased tolerance to jamming is achieved in the present invention. With reference to FIG. 2, it may be seen that the synchronization code sequence using frequencies $f_M$ and $f_N$ is hidden in the time hopping sequence, and transmitted on a subset (two frequencies) of the full spectrum of frequencies (64 frequencies). Also, in the circuits shown in FIGS. 3 and 4, synchronization codes may be easily changed on-line during system operation to use different frequencies in different pseudo-random signature sequences. This may be achieved by selecting different sequences in the ROM 312 with the address counter 310 in transmitter 300, and by selecting corresponding frequencies with the detectors 414, 415 and corresponding signatures with the correlators 418, 419 in the receiver 400. Also, because more than one frequency is used for synchronization, the loss of one frequency due to jamming or fading will not abort operation because a single remaining valid synchronization frequency still facilitates synchronization. Hence, synchronization codes in accordance with the present invention are difficult to detect by an unauthorized user, are difficult to jam, and provide a significant degree of tolerance to fading.

Attempts at spoofing the receiver 400 by transmitting a delayed repeat of a received signal are relatively ineffective. This is because there is a delay in generating the spoofed sequence while the speed of synchronization, implicit in the interleaving of the synchronization code, facilitates synchronization before the spoofing signal is generated. Furthermore, increased tolerance to poor synchronization conditions is achieved with the present invention. This is because of the continuous and rapid repetitive nature of the synchronization code sequence which is repeated each frame (see FIG. 2) and hence provides rapid and repetitive resynchronization capability.

Programmable frequency detectors and programmable correlators 418, 419 permit taps to be changed to accommodate changes in the signatures of the synchronization signals. An array processor may be employed to perform a fast Fourier transform generating a spectrum of frequency signals, then to perform frequency domain correlation on each of the synchronization frequencies, and then to detect a peak condition to reset the clock as being indicative of synchronization. Programmability facilitates changing of synchronization frequencies and signatures on-line and hence provides greater tolerance to jammers.

Thus there has been described a new and improved technique that provides for entry synchronization to a frequency hopping communication network without the use of a conventional synchronizing preamble. The arrangement of the present invention is useful to provide a network synchronization arrangement for frequency hopping communication systems that corrects for large initial time errors, and that continuously or periodically updates system timing. This is accomplished without the use of long preambles or special broadcasts. It is to be understood that the abovedescribed embodiment is merely illustrative of some of the many specific embodiments which represent applications of the principles of the present invention. Clearly, numerous and other arrangements can be readily devised by those skilled in the art without departing from the scope of the invention.

What is claimed is:

1. A frequency hopping communication transmitter comprising:
   a controller adapted to generate a sequence of control signals for each of a plurality of frames of communication information, wherein the sequence of control signals includes at least one synchronization control signal pseudo-randomly interleaved with a plurality of data control signals;
   a frequency synthesizer coupled to the controller and adapted to generate a sequence of pseudo-random frequency hopped signals including at least one synchronization frequency signal randomly interleaved with a plurality of data frequency signals in response to the at least one synchronization control signal and plurality of data control signals; and
   a transmitter coupled to the frequency synthesizer and adapted to transmit the synchronization frequency signal and plurality of data frequency signals as an interleaved pseudo-random frequency hopping communication signal.

2. A frequency hopping communication receiver comprising:
   a preprocessor adapted to generate a sequence of frequency signals in response to an applied pseudo-random frequency hopping communication signal comprising at least one synchronization frequency signal and a plurality of data frequency signals;
   a frequency detector coupled to the preprocessor and adapted to generate synchronizting frequency signals in response to detection of a frequency signal having a predetermined frequency;
   a correlator coupled to the frequency detector and adapted to generate a synchronizing signature signal in response to a sequential combination of synchronizing frequency signals; and
   a synchronizing clock coupled to the correlator and adapted to generate a synchronizing clock signal in synchronization with the synchronizing signature signal, which synchronizing signature signal is adapted to synchronize the receiver with transmission of a transmitter from which the applied pseudo-random frequency hopping communication signal was generated.

3. The frequency hopping communication receiver of claim 2 wherein:
   the applied pseudo-random frequency hopping communication signal comprises two synchroniztion frequency signals;
   the frequency detector includes a first detector circuit adapted to generate a first synchronizing frequency signal in response to detection of a first frequency signal having a first selected frequency included in the sequence of frequency signals, and adapted to generate a second synchronizing frequency signal in response to detection of a second frequency signal having a second selected frequency included in the sequence of frequency signals;
   the correlator includes a first correlator processor adapted to generate a first synchronizing signature signal in response to a sequential combination of the first synchronizing frequency signal and a second correlator processor adapted to generate a second synchronizing signature signal in response to a sequential combination of the second synchronizing frequency signal; and
   the synchronizing clock is adapted to generate the synchronizing clock signal in synchronization with a selected one of the first and second synchronizing signature signals.

4. A frequency hopping communication system that provides for preamble-less network entry synchronization, said system comprising:
   a controller adapted to generate a sequence of control signals for each of a plurality of frames of communication information, wherein the sequence of control signals includes at least one synchronization control signal interleaved with a plurality of data control signals;
   a frequency synthesizer coupled to the controller and adapted to generate a sequence of pseudo-random frequency hopped signals including at least one synchronization frequency signal and a plurality of data frequency signals in response to the at least one synchronization control signal and plurality of data control signals; and
   a transmitter coupled to the frequency synthesizer and adapted to transmit the at least one synchronization frequency signal and plurality of data frequency signals as an interleaved pseudo-random frequency hopping communication signal;
   a receiver electromagnetically coupled to the transmitter and adapted to generate a sequence of frequency signals in response to an applied pseudo-random frequency hopping communication signal comprising at least one synchronization frequency signal and a plurality of data frequency signals;

a frequency detector coupled to the preprocessor and adapted to generate synchronizing frequency signals in response to detection of a frequency signal having a predetermined frequency;

a correlator coupled to the frequency detector and adapted to generate a synchronizing signature signal in response to a sequential combination of synchronizing frequency signals; and a synchronizing clock coupled to the correlator and adapted to generate a synchronizing clock signal in synchronization with the synchronizing signature signal, which synchronizing signature signal is adapted to synchronize the receiver with transmission of the transmitter.

5. In a networked frequency hopping communication system, a method of synchronizing network entry comprising the steps of:

generating a frame of interleaved pseudo-random frequency hopping signals comprising a frame synchronization signal pseudo-randomly interleaved with a plurality of data signals;

transmitting the frame of interleaved pseudo-random frequency hopping signals;

receiving the transmitted frame of interleaved pseudo-random frequency hopping signals;

separating the frame synchronization signal from the interleaved pseudo-random frequency hopping signals;

synchronizing a clock signal in response to the frame synchronization signal in order to synchronize to the network.

6. The method of claim 5 wherein the steps of separating the frame synchronization signal from the interleaved pseudo-random frequency hopping signals and synchronizing the clock comprises the steps of:

processing the interleaved pseudo-random frequency hopping signals to detect the frame synchronization signal; and correlating the frame synchronization signal with the clock signal to synchronize to the network.

7. The method of claim 6 further comprising the step of:

generating a plurality of data signals in response to the received pseudo-randomly interleaved frequency hopping signals and the synchronized clock signal.

8. In a frequency hopping communication system, a method of synchronizing network entry comprising the steps of:

generating a frame of interleaved frequency hopping signals including a frame synchronization signal pseudo-randomly interleaved with a plurality of data signals;

transmitting the frame of interleaved frequency hopping signals to a remote location;

receiving the frame of interleaved frequency hopping signals at the remote location;

separating the frame synchronization signal from the frame of interleaved frequency hopping signals;

synchronizing remote location clock signals to the frame synchronization signal to generate a frame synchronized clock signal that synchronize the remote location to the transmitted frame synchronization signal and hence synchronize the remote location to the network.

9. The method of claim 8 further comprising the step of:

generating a plurality of data signals in response to the received pseudo-randomly interleaved frequency hopping signals and the frame synchronized clock signals.

10. In a frequency hopping communication transmitter comprising a controller for generating a sequence of control signals for each of a plurality of frames of communication information, a frequency synthesizer coupled to the controller for generating a sequence of frequency signals, and a transmitter coupled to the frequency synthesizer for transmitting the sequence of frequency signals, wherein the improvement comprises:

means for pseudo-randomly interleaving a frame synchronization signal with a plurality of data signals in the sequence of frequency signals transmitted by the transmitter.

11. In a frequency hopping communication receiver comprising a receiver for generating a sequence of input frequency signals in response to receipt of a frequency hopping communication signal, a frequency detector coupled to the receiver for generating output frequency signals in response to the sequence of input frequency signals, wherein the improvement comprises:

correlator means coupled to the frequency detector for generating synchronizing signature signals in response to a sequential combination of the output frequency signals; and a synchronizing clock coupled to the correlator for generating a synchronizing clock signal in synchronism with the synchronizing signature signals that synchronizes the receiver to a transmitter that communicated the frequency hopping communication signal.

12. In a networked frequency hopping communication system, a method of synchronizing network entry comprising the steps of:

generating a frame of interleaved pseudo-random frequency hopping signals comprising a frame synchronization signal pseudo-randomly interleaved with a plurality of data signals;

transmitting the frame of interleaved pseudo-random frequency hopping signals;

receiving the transmitted frame of interleaved pseudo-random frequency hopping signals;

separating the frame synchronization signal from the interleaved pseudo-random frequency hopping signals by processing the interleaved pseudo-random frequency hopping signals to detect the frame synchronization signal; and synchronizing a clock signal in response to the frame synchronization signal by correlating the frame synchronization signal with the clock signal to synchronize to the network.

13. The method of claim 12 further comprising the step of:

generating a plurality of data signals in response to the received pseudo-randomly interleaved frequency hopping signals and the synchronized clock signal.

14. In a frequency hopping communication system, a method of synchronizing network entry comprising the steps of:

generating a frame of interleaved frequency hopping signals including a frame synchronization signal pseudo-randomly interleaved with a plurality of data signals;

transmitting the frame of interleaved frequency hopping signals to a remote location;

receiving the frame of interleaved frequency hopping signals at the remote location;

separating the frame synchronization signal from the frame of interleaved frequency hopping signals;

generating a plurality of data signals in response to the received pseudo-randomly interleaved frequency hopping signals and the frame synchronized clock signals; and synchronizing remote location clock signals to the frame synchronization signal to generate a frame synchronized clock signal that synchronize the remote location to the transmitted frame synchronization signal and hence synchronize the remote location to the network.

* * * * *